United States Patent [19]
Trop et al.

[11] 4,325,979
[45] Apr. 20, 1982

[54] POWDERED COMPOSITIONS FOR CREAM TOPPINGS

[75] Inventors: Moshe Trop; Avinoam Livne, both of Beer Sheva, Israel

[73] Assignee: Ben-Gurion University of the Negev Research and Development Authority, Beer Sheva, Israel

[21] Appl. No.: 190,133

[22] Filed: Sep. 24, 1980

[30] Foreign Application Priority Data

Sep. 28, 1979 [IL] Israel .................................. 58363

[51] Int. Cl.³ .............................................. A23J 3/02
[52] U.S. Cl. .................................... 426/570; 426/613
[58] Field of Search ............... 426/570, 564, 572, 566, 426/613

[56] References Cited
U.S. PATENT DOCUMENTS 3,251,696 5/1966 Miles, Jr. et al. ................... 426/570
3,656,972 4/1972 Blomberg ........................... 426/570
3,968,267 7/1976 Ogasa ................................. 426/570

*Primary Examiner*—Jeanette M. Hunter
*Attorney, Agent, or Firm*—Pollock, Vande Sande & Priddy

[57] ABSTRACT

The invention provides a powdered composition, suitable for mixing with a liquid to obtain a cream topping, comprising, by weight proportions, about 30 to about 45 parts of a vegetable lipid whipping agent, about 5 to 15 parts whole milk powder, about 3 to 5 parts sodium caseinate and about 30 to 60 parts sugar, wherein the lipid whipping agent comprises about 15 to 35% of sugar or corn syrup solids, about 6 to 11% sodium caseinate and about 50 to 70% of a lipid component, which lipid component comprises about 75 to 85% partially hydrogenated vegetable oil, about 10 to 12% lactylated fatty acid esters of a polyalcohol and about 8 to 10% of fatty acid mono or diglycerides.

16 Claims, No Drawings

POWDERED COMPOSITIONS FOR CREAM TOPPINGS

The present invention relates to powdered compositions suitable for mixing with a liquid such as cold milk or cold water to obtain a cream topping.

More specifically the present invention comes to provide powdered compositions having extremely long shelf-lives which can at a moment's notice be taken and combined with milk or water to produce a cream topping, which cream topping itself, when protected from bacterial degeneration and refrigerated, will remain stable and edible for several days.

Accordingly, the present invention provides a powdered composition suitable for mixing with a liquid to obtain a cream topping, comprising, by weight proportions, about 30 to about 45 parts of a vegetable lipid whipping agent, about 5 to 15 parts whole milk powder, about 3 to 5 parts sodium caseinate and about 30 to 60 parts sugar, wherein said lipid whipping agent comprises about 15 to 35% of sugar or corn syrup solids, about 6 to 11% sodium caseinate and about 50 to 70% of a lipid component, which lipid component comprises about 75 to 85% partially hydrogenated vegetable oil, about 10 to 12% lactylated fatty acid esters of a polyalcohol and about 8 to 10% of fatty acid mono or diglycerides.

The vegetable lipid whipping agent which forms one ingredient of the compositions of the present invention and which will be described in more detail hereinafter has been developed to replace cream for making instant aerated products without the storing and handling disadvantages of fresh cream as a manufacturing ingredient. Said whipping agent has a neutral taste and whippable properties but cannot be overwhipped.

The powdered compositions of the present invention can optionally further comprise about 2 to about 10 parts of a texture stabilizer and especially preferred texture stabilizers are precooked starch or instant gelatine.

When the powder mixture of the present invention is mixed and whipped with cold water or cold milk, in the ratio of about 1 to 2, solid to liquid, respectively, the volume increase is $2\frac{1}{2}$ or more. The topping remains stable, when protected from bacterial degeneration, for about a week.

The final cream topping produced using the powder of the present invention is an aqueous oil emulsion containing not more than 50% by weight of fat and an aqueous phase having a pH in the range of about 5.2 to 7.5 and comprising about 0.5% to 4% of its weight of globular protein, which act as emulsifiers and provide important taste and texture properties, and a non-protein emulsifier of the type that forms a flocculate in water at the pH of the aqueous phase in an amount sufficient to retain dispersed gas when the emulsion is whipped. Both water-in-oil emulsions and oil-in-water emulsions can be prepared, but in most cases an oil-in-water emulsion is preferable.

Globular proteins are proteins which form stable colloidal solutions in water in the whole pH range of 2.0 to 7.0. The preferred amount of globular protein is 1.0 to 2.5%. The sodium caseinate and the powdered milk provide the globular proteins the heat stability of which is such that an emulsion containing said protein can be pasteurized without appreciable coagulation of the protein.

The non-protein emulsifier is preferably present in an amount of about 0.3 to 2.0% by weight of the emulsion, a range of about 0.5 to 1.0 being most preferable. Suitable emulsifiers that form a flocculate in water at the pH of the aqueous phase are nonionic emulsifiers such as partial fatty acid esters of polyalcohols, for example, glycerol, propylene glycol and glycerolactopalmitate. Preferably a partial palmitic acid glyceride is used as an emulsifier. Both partial glycerides having a monoglyceride content of about 90%, the so-called high mono's, and partial glycerides having about equal amounts of monoglycerides and diglycerides, the so-called mono-diglycerides, can be used.

Other ingredients which are usual in cream-type products can be added in appropriate amounts, if desired, for example lecithin in an amount of 0.05 to 0.5% by weight of the emulsion which is favorable for improving the rigidity of the whipped cream, and monosaccharides and/or disaccharides in an amount of 3 to 20% by weight of the emulsion which can be used for sweetening purposes. also artificial sweeteners and natural and artificial colors and flavors can be applied.

While the relative proportions of component ingredients has been expressed in terms of proportional parts by weight, another way of expressing said relationship is in terms of gram amounts of components in a single batch of powder suitable for mixing with about 200 ml of liquid to produce the desired cream topping.

Thus, an especially preferred embodiment of the present invention can be characterized as comprising about 38 to 42 g vegetable lipid whipping agent, about 10 to 13 g whole milk powder about 3.5 to 4.5 g sodium caseinate and about 40 to 50 g sugar.

The cream topping itself is simply prepared by taking a glass (200 ml) of cold water or cold milk (temperature preferably about 0°-10° C.) and pouring into a whipping bowl. About 100-110 g of the powder mixture is added and dispersed for 10-30 seconds and then it is whipped for 2-5 minutes to produce a light, fluffy and delicious natural tasting cream topping.

The invention will now be described in connection with certain preferred embodiments in the following examples so that it may be more fully understood. It is not, however, intended to limit the invention to these particular embodiments. On the contrary, it is intended that all alternatives, modifications and equivalents as may be included within the scope of the invention as defined by the appended claims be included herein. Thus, the following examples which include preferred embodiments will serve only to illustrate the practice of this invention, it being understood that the particular formulations described are by way of example and for purposes of illustrative discussion of preferred embodiments of the present invention only and are presented in the cause of providing what is believed to be the most useful and readily understood description of formulation procedures as well as of the principles and conceptual aspects of the invention.

Before discussing several preferred examples of compositions prepared according to the present invention, the manner of preparation of the vegetable lipid whipping agents usable therein will now be presented.

First an aqueous solution containing about 50 to about 70% sugar or corn syrup solids and 18 to about 22% sodium caseinate is heated to about 48°-50° C. There is separately prepared a lipid composition composed of about 75 to 85% partially hydrogenated vegetable oil, e.g., palm kernel, coconut, cottonseed oil, etc., having a wetting point of about 30°–50° C., about 10 to 12% lactylated fatty acid esters of glycerol and propylene glycol and about 8 to 10% of fatty acid mono and/or diglycerides. Said aqueous and lipid solutions are then combined in a 1:1 to 3:7 ratio to form an emulsion suspension, the temperature of which is raised to 75° C. for 30 minutes after which the dispersion is homogenized and spray dried to form the dry lipid whipping agent used in the examples hereinafter.

EXAMPLE 1

| Lipid whipping agent | 40 g |
|---|---|
| Sugar | 40 g |
| Sodium caseinate | 4 g |
| Whole milk powder | 10 g |

The above dry mixture was whipped together with 200 ml cold milk and a volume increase of more than 2½ times was noted. The resulting cream topping had excellent taste and consistency and remained stable under refrigeration conditions for several days.

EXAMPLE 2

| Lipid whipping agent | 38 g |
|---|---|
| Sugar | 50 g |
| Sodium caseinate | 3.5 g |
| Whole milk powder | 12 g |
| Instant gelatin | 3 g |

The above dry powder compositions was whipped together with 200 ml cold water and a volume increase of about 2½ times was noted. The resulting cream topping had excellent taste and a fluffy whipped texture which remained under refrigeration conditions for several days.

EXAMPLE 3

| Lipid whipping agent | 42 g |
|---|---|
| Sugar | 44 g |
| Sodium caseinate | 4.5 g |
| Whole milk powder | 11 g |
| Precooked starch | 5 g |

The above dry powdered composition was whipped together with 200 ml cold skim milk and also produced a resulting cream topping of excellent taste and consistency.

It will be evident to those skilled in the art that the invention is not limited to the details of the foregoing illustrative embodiments and that the present invention may be embodied in other specific forms without departing from the essential attributes thereof, and it is, therefore, desired that the present embodiments and examples be considered in all respects as illustrative and not restrictive, reference being made to the appended claims, rather than to the foregoing description, and all changes which come with the meaning and range of equivalency of the claims are, therefore, intended to be embraced therein.

What is claimed is:

1. A powdered composition, suitable for mixing with a liquid to obtain a cream topping, comprising, by weight proportions, about 30 to about 45 parts of a vegetable lipid whipping agent, about 5 to 15 parts whole milk powder, about 3 to 5 parts sodium caseinate and about 30 to 60 parts sugar, wherein said lipid whipping agent comprises about 15 to 35% of sugar or corn syrup solids, about 6 to 11% sodium caseinate and about 50 to 70% of a lipid component, which lipid component comprises about 75 to 85% partially hydrogenated vegetable oil, about 10 to 12% lactylated fatty acid esters of a polyalcohol and about 8 to 10% of fatty acid mono or diglycerides or mixture of said mono and diglycerides.

2. A powdered composition according to claim 1 further comprising about 2 to about 10 parts of a texture stabilizer.

3. A powdered composition according to claim 2 wherein said texture stabilizer is precooked starch.

4. A powdered composition according to claim 2 wherein said texture stabilizer is instant gelatine.

5. A powdered composition according to claim 1 suitable for mixing with a liquid to obtain a cream topping, said composition comprising, per 200 ml liquid, about 38 to 42 g of said vegetable lipid whipping agent, about 10 to 13 g whole milk powder, about 3.5 to 4.5 g sodium caseinate and about 40 to 50 g sugar.

6. A cream topping whenever produced by whipping together 200 ml of cold liquid and the powdered composition of claim 5.

7. A cream product according to claim 6 wherein said liquid is selected from the group consisting of cold milk and cold water.

8. The powdered composition of claim 1 wherein said partially hydrogenated vegetable oil has a wetting point of about 30°–50° C.

9. The powdered composition of claim 8 wherein said partially hydrogenated vegetable oil is from an oil selected from the group of palm kernel oil, coconut oil or cottonseed oil.

10. The powdered composition of claim 1 wherein said lactylated fatty acid esters are esters of glycerol and propylene glycol.

11. The cream product of claim 7 wherein the powdered composition and liquid are mixed in a ratio of about 1 to 2.

12. The cream product of claim 7 which is an aqueous oil emulsion which contains no more than 50% by weight of fat, wherein the aqueous phase has a pH of about 5.2 to 7.5 and about 0.5 to 4% by weight of globular protein.

13. The cream product of claim 12 wherein the amount of globular protein in said aqueous phase is 1.0 to 2.5% by weight.

14. The cream product of claim 7 which is an oil-in-water emulsion.

15. The cream product of claim 7 which contains 0.05 to 0.5% by weight of lecithin.

16. The cream product of claim 7 which contains 3–20% by weight of monosaccharides or disaccharides or both.

* * * * *